United States Patent
Stolorz et al.

(10) Patent No.: US 12,457,268 B2
(45) Date of Patent: Oct. 28, 2025

(54) FAST ESTIMATION OF DOWNLOADS FOR APPS AT LAUNCH

(71) Applicant: DATA.AI INC., San Francisco, CA (US)

(72) Inventors: Paul Ernest Stolorz, Los Altos, CA (US); Tadaishi Yatabe Rodriguez, Uppsala (SE); Abbie Marin Popa, Oakland, CA (US)

(73) Assignee: Data.ai Inc., San Francisco, CA (US)

( * ) Notice: Subject to any disclaimer, the term of this patent is extended or adjusted under 35 U.S.C. 154(b) by 0 days.

(21) Appl. No.: 17/700,179

(22) Filed: Mar. 21, 2022

(65) Prior Publication Data

US 2022/0311834 A1    Sep. 29, 2022

Related U.S. Application Data

(60) Provisional application No. 63/165,674, filed on Mar. 24, 2021.

(51) Int. Cl.
*H04L 67/50* (2022.01)

(52) U.S. Cl.
CPC ................................. *H04L 67/535* (2022.05)

(58) Field of Classification Search
CPC ..... H04L 67/535; H04L 41/147; H04L 67/34; H04L 69/28; G06F 2201/81; G06F 8/61; G06F 11/302; H04W 4/50
See application file for complete search history.

(56) References Cited

U.S. PATENT DOCUMENTS

| | | | |
|---|---|---|---|
| 7,490,045 B1 * | 2/2009 | Flores | G06Q 10/10 |
| | | | 702/62 |
| 7,818,741 B1 * | 10/2010 | Bourdev | G06F 21/105 |
| | | | 717/174 |

(Continued)

FOREIGN PATENT DOCUMENTS

| | | |
|---|---|---|
| EP | 3111399 B1 | 10/2018 |
| WO | WO 2015/128536 A1 | 9/2015 |

OTHER PUBLICATIONS

Gokgoz et al., "There's an app for that! Understanding the drivers of mobile application downloads", Journal of Business Research, vol. 123, Feb. 2021, pp. 423-437, retrieved on [Jun. 29, 2022]. Retrieved from the internet <URL:https://www.sciencedirect.com/science/article/pii/S0148296320306536>.

(Continued)

*Primary Examiner* — Ramy M Osman
(74) *Attorney, Agent, or Firm* — VLP Law Group, LLP

(57) ABSTRACT

An analytics system determines the number of downloads for a content item during a first time interval. The system receives engagement data from a plurality of client devices in a panel of client devices. Based on the engagement data, a partial install base for the content item during the first time interval is determined. Based on the determined partial install base for the content item and historical data for other content items, a preliminary install base for the content item during the first time interval is determined. Responsive to determining that the engagement for the content item is greater than a threshold value, an estimated number of downloads for the content item during the first time interval is determined. The estimated number of downloads for the content item during the first time interval is determined based on the preliminary install base for the content item for the first time interval.

20 Claims, 4 Drawing Sheets

(56) References Cited

U.S. PATENT DOCUMENTS

| | | | |
|---|---|---|---|
| 9,177,255 B1* | 11/2015 | Procopio | G06F 8/60 |
| 9,191,374 B1* | 11/2015 | Kim | H04L 67/60 |
| 10,089,661 B1* | 10/2018 | Appalaraju | G06F 16/907 |
| 2006/0026055 A1* | 2/2006 | Gascoigne | G06Q 30/02 |
| | | | 705/7.29 |
| 2010/0094714 A1* | 4/2010 | Varon | G06Q 30/0283 |
| | | | 705/26.1 |
| 2010/0248699 A1* | 9/2010 | Dumais | H04L 67/1095 |
| | | | 455/414.1 |
| 2012/0291022 A1* | 11/2012 | Mehta | G06F 8/60 |
| | | | 717/176 |
| 2013/0138577 A1* | 5/2013 | Sisk | G06Q 40/04 |
| | | | 705/36 R |
| 2013/0204664 A1 | 8/2013 | Romagnolo et al. | |
| 2014/0236846 A1* | 8/2014 | Melika | H04W 4/50 |
| | | | 705/310 |
| 2014/0317610 A1* | 10/2014 | Belfoure | G06F 16/93 |
| | | | 717/168 |
| 2014/0351041 A1* | 11/2014 | Brown | G06Q 30/0246 |
| | | | 705/14.45 |
| 2015/0095166 A1 | 4/2015 | Sweeney | |
| 2015/0244820 A1* | 8/2015 | Verkasalo | H04L 67/535 |
| | | | 707/740 |
| 2015/0262224 A1* | 9/2015 | Brown | G06F 11/3051 |
| | | | 705/14.45 |
| 2015/0310498 A1 | 10/2015 | Brandstetter | |
| 2016/0103561 A1* | 4/2016 | Lee | H04N 21/6581 |
| | | | 715/716 |
| 2016/0342755 A1* | 11/2016 | Yom-Tov | G06F 16/951 |
| 2016/0352848 A1* | 12/2016 | Lin | H04L 67/535 |
| 2017/0153879 A1* | 6/2017 | George | H04W 12/088 |
| 2018/0004497 A1* | 1/2018 | Ramachandran | G06F 11/3419 |
| 2019/0028476 A1* | 1/2019 | Li | H04L 63/10 |
| 2019/0098037 A1* | 3/2019 | Shenoy, Jr. | H04L 63/1441 |
| 2021/0248053 A1* | 8/2021 | Wei | H04L 63/104 |
| 2022/0215494 A1* | 7/2022 | Haffizulla | H04L 67/535 |
| 2025/0117204 A1* | 4/2025 | Salhov | G06F 8/61 |

OTHER PUBLICATIONS

International Search Report and Written Opinion, Patent Cooperation Treaty Application No. PCT/US2022/021192, Jul. 29, 2022, 11 pages.

* cited by examiner

FAST ESTIMATION OF DOWNLOADS FOR APPS AT LAUNCH

CROSS REFERENCE TO RELATED APPLICATIONS

This application claims the benefit of U.S. Provisional Application No. 63/165,674, filed Mar. 24, 2021, which is incorporated by reference in its entirety.

BACKGROUND

This disclosure relates generally to the challenge of estimating the number of downloads of apps on mobile devices, and more specifically to estimating the number of downloads on the day of release of a particular app on an app store for the first time, and for the next few days thereafter.

Content publishers oftentimes apply labels to content items to guide users filtering the vast amount of content that can be access through their systems. Users can quickly skim through labels to focus their attention on content items that include labels that the users think will interest them. However, labels are not consistent across content publishers, even if two or more content publishers are offering the same content items. As such, users may end up getting confused by the labels and they may end up missing out on content items that would have been interesting to them but for the improper label being applied. Moreover, labels applied by content publishers may be broad and they can sometimes conflate substantially different content items into the same category.

Furthermore, given that certain content items may have soft launches (when a select number of people are allowed to access the content item) preceding a hard launch (when the general population is allowed to access the content item), it can be difficult to ascertain the reach of the content item (e.g., the number of downloads of the content item) during the hard launch day. Moreover, it can also be difficult to ascertain the reach of the content item during time periods following the hard launch date due noise caused by users uninstalling and reinstalling the content item.

SUMMARY

An analytics system determines the number of downloads for a content item during a first time interval (e.g., during a hard launch of the content item). The system receives engagement data from a plurality of client devices in a panel of client devices. In some embodiments, each client device in the panel of the client devices has a reporting application installed. The reporting application reports back to the analytic system which content items have been accessed by the client device during a set of time intervals. The reporting application may be installed by the user of the client device, and may get implicit permission from the user of the client device to report the access of the content items from specific content item publishers. Alternatively, the reporting application is part of the content item publisher and keeps track of the content items that are accessed by the client device from the content item publisher.

Based on the engagement data, a partial install base for the content item during the first time interval is determined. Based on the determined partial install base for the content item and historical data for other content items, a preliminary install base for the content item during the first time interval is determined. Responsive to determining that the engagement for the content item is greater than a threshold value, an estimated number of downloads for the content item during the first time interval is determined. The estimated number of downloads for the content item during the first time interval is determined based on the preliminary install base for the content item for the first time interval.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

This invention relates to the challenge of estimating the number of downloads of apps on mobile devices, especially on the day of release of a particular app on an app store for the first time, and for the next few days thereafter. This metric is an extremely useful one for gauging the popularity of a new app, and can be used to inform multiple business decisions.

System Architecture

Figure 1:
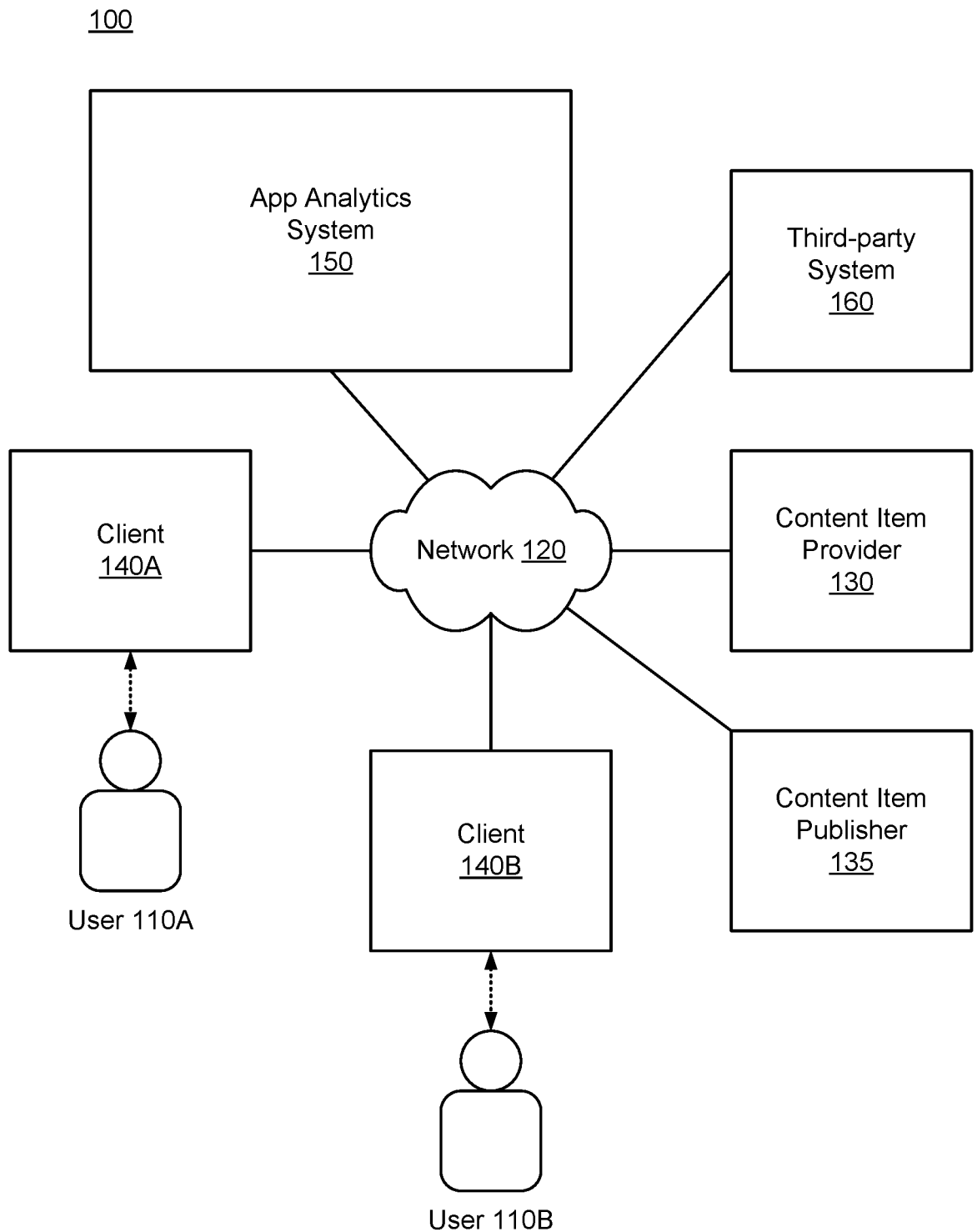
FIG. 1 is a block diagram of a system environment for content classification system, according to one embodiment.

FIG. 1 is a block diagram of a system environment 100 for app analytics system 150. The system environment 100 shown by FIG. 1 includes one or more client devices 140, a network 120, one or content item providers 130, one or more content item publishers 135, one or more third-party systems 160, and the app analytics system 150. In alternative configurations, different and/or additional components may be included in the system environment 100. Moreover, in alternative configurations, one or more systems may be combined into a single entity, or may be provided by a single entity. For example, the content item publisher 135 can be combined with the app analytics system 150 to form a single system that both classifies content items and provides access to the content items to users of the content item publisher.

The client devices 140 are one or more computing devices capable of receiving user input as well as transmitting and/or receiving data via the network 120. In one embodiment, a client device 140 is a conventional computer system, such as a desktop or a laptop computer. Alternatively, a client device 140 may be a device having computer functionality, such as a personal digital assistant (PDA), a mobile telephone, a smartphone, or another suitable device. A client device 140 is configured to communicate via the network 120. In one embodiment, a client device 140 executes an application allowing a user of the client device 140 to interact with the content item publisher 135. For example, a client device 140 executes a browser application to enable interaction between the client device 140 and the content item publisher 135 via the network 120. In another embodiment, a client device 140 interacts with the content item publisher 135 through an application programming interface (API) running on a native operating system of the client device 140, such as IOS® or ANDROID™.

The client devices 140 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The content item provider 130 provides content item to the content item publisher 135 for distribution to client devices 140. The content item provider 130 additionally provides information related to the content items to inform the users and guide the users in choosing what content items to consume. The term content item, as used herein, may refer to any form of media (e.g., audio, visual, haptic, and any combination thereof) consumable by a user of a client device 140. For example, a content item provided by a content item provider 130 is a mobile game to be played by a user 110 through a client device 140. The game is distributed through app stores acting as content item publishers 135. The information associated with the mobile game includes a description about the gameplay and features of the game to persuade users to download and play the mobile game.

In some embodiments, the content item publishers 135 additionally generate information such as metrics information related to the performance of the content item in the publisher, and affinity information related to other content items that users commonly consume when in addition to a particular content item.

The system environment may additionally include third-party systems 160. For example, third-party systems may provide additional information regarding the content items that are being distributed by the content item publisher 135. For instance, a third-party system 160 may be a review site that provides an independent review and commentary about the content items.

The app analytics system 150 receives feedback data from client devices 140, the content provider 130, and the content item publisher 135, and generates analytics for various content items distributed by the content item publisher 135. In some embodiments, a mobile application (app) is installed in client devices 140. After receiving a set of permissions to access certain type of data, the mobile application is able to provide the feedback data from the mobile application to the app analytics system 150. For example, the app installed in the client device is able to determine a set of apps that are installed in the client device, and provides this information to the app analytics system 150. In another example, the app measures an amount of time a specific app is active within a set time period and sends this information to the app analytics system 150.

Launch Day (Day 0) Download Estimates

The app analytics system 150, as described herein, enables the estimation of app downloads immediately (or within a short amount of time) upon launch (day 0). The app analytics system 150 uses app engagement data available from a panel of mobile devices 140 (e.g., mobile devices having an app provided by the app analytics system that is able to collect and send the app engagement data from the mobile devices 140 to the app analytics system 150), instead of using data from a content item publisher 135 (such as an app store). The app analytics system 150 takes advantage of the fact that engagement data can include a parameter that is flagged on a mobile device in the panel to indicate if a given app is installed on the device. From this the app analytics system 150 can calculate an "Install Base" (TB) metric, of a given app A across a region or country:

$$\text{Install Base of App } A = \left(\frac{\text{\#devices in Panel on which App } A \text{ is installed}}{\text{size of panel}}\right) \times \text{Device population} \quad (1)$$

The number of downloads of App A on launch day (day 0) is the Install Base of the app recorded for launch day (since it can be assumed that on launch day every count in the Install Base comes from a download on that launch day). Note that on any day after launch day, this may no longer be the case (e.g., because a portion of the Install Base for a given day after the launch day might be attributed to previous day, and because the Install Base for a given day may be reduced by people deleting or uninstalling the app).

However, while the install flag for an app on a given mobile device in the panel might be set on launch day, it may take several days for that information to be transmitted back to the app analytics system 150 to compute the Install Base. In particular, some mobile devices may have a delayed reporting of a download that took place on launch day until several days after launch day. As such, the count for the Install Base received by the app analytics system 150 may undercount the actual install base for the panel of mobile devices.

To solve this problem, the app analytics system 150 uses the Install Base counts collected on launch day itself. The app analytics system 150 then infers what the full Install Base would be if extrapolated across several days (e.g., 4 days) by computing and applying historical ratios of 1-4-day counts.

To accomplish this task, the app analytics system 150 performs two operations. First, the app analytics system 150 automatically detects when a new app launch has occurred so that the app analytics system 150 can begin tracking the Install Base for that app. Moreover, the app analytics system 150 intercepts the regular workflow that computes Install Base over a set number of days (e.g., 4 days) so that daily totals are available on launch day.

App Detection & Intercepting Regular Workflow

There are several ways that new apps can be detected. For example, one way is to search for social signals on the web that an app has been launched. Alternatively, a new app might be detected by analyzing logs of engagement data, and by flagging the appearance of any new app identifier.

To detect a new app using engagement data, several modes might be used. The app analytics system 150 may use automatic detection of new apps from usage logs (New App detector). The automatic detections of new apps may be performed by analyzing a ranking history of apps in the content item publisher 135 (e.g., an app store). Alternatively, the app analytics system 150 may detect new apps based on a curated list. For example, the app analytics system 150 detects new apps using install base thresholds of apps in the curated list. In some embodiments, two or more methods are used concurrently.

The automatic detection component includes a way to match app names with numerical identifiers for the app in the content item publisher 135 (e.g., the app store), since there is often ambiguity in language used to tag apps. In some embodiments, the new app detector compares the install base of an app for the current time interval (e.g., past 24 hours, past full day from midnight to midnight in a given time zone, past week, etc.) to the install base for the app on a previous time interval. If the ratio between the install base for the current time interval and the install base for the previous time interval is above a threshold (e.g., a threshold percentage increase; a threshold discrete amount, and so on), the new app detector identifies the current day as a launch day for the app. This manner of automatic detection ensures that "soft launches" (that are only available or used by a small number of people) that are followed by "full launches" (that include many people) can qualify as a "new app" notwithstanding an earlier release. In other embodiments, the automatic detection component determines that a specific time interval corresponds to a soft launch for an app by comparing the number of downloads for the app to a threshold determined based on the importance of the app and the magnitude of the market. If the number of downloads is below the threshold, the automatic detection determines that a time interval corresponds to a soft launch.

The regular engagement data workflow generates cumulative totals of metrics such as Install Base over several days as various mobile devices in the panel report back to the app analytics system 150 overtime. The app analytics system 150 pulls out the first daily Install Base value for apps found by the New App detector above. This step is included in the workflow shown in FIG. 2.

Download Estimates for Subsequent Days

For each platform and country, the app analytics system 150 estimates downloads during a set time period (e.g., days 1 through 13) post release date using an exponential decay of the form $$a \times \exp(bx) \qquad (2)$$

where a is the value of downloads at day 0 (launch day), b is the exponential decay rate, and x is the time (e.g., 0 through 13, i.e., two weeks). For estimating b, the exponential decay rate, the app analytics system 150 use data from previous blockbuster apps (e.g., apps that had at least a threshold number of downloads at launch day according to historical data and/or that had at least a threshold amount of users within time interval following launch day). With this data the app analytics system 150 estimates region (e.g., country) specific decay rates for most regions (e.g., using a statistical aggregate of decay rates for historical blockbuster apps, the historical data segmented by region). For regions where no data was available to estimate region specific decay rates, the app analytics system 150 may estimate a default decay rate based on the data from all regions.

Pipeline Details

Figure 2A:
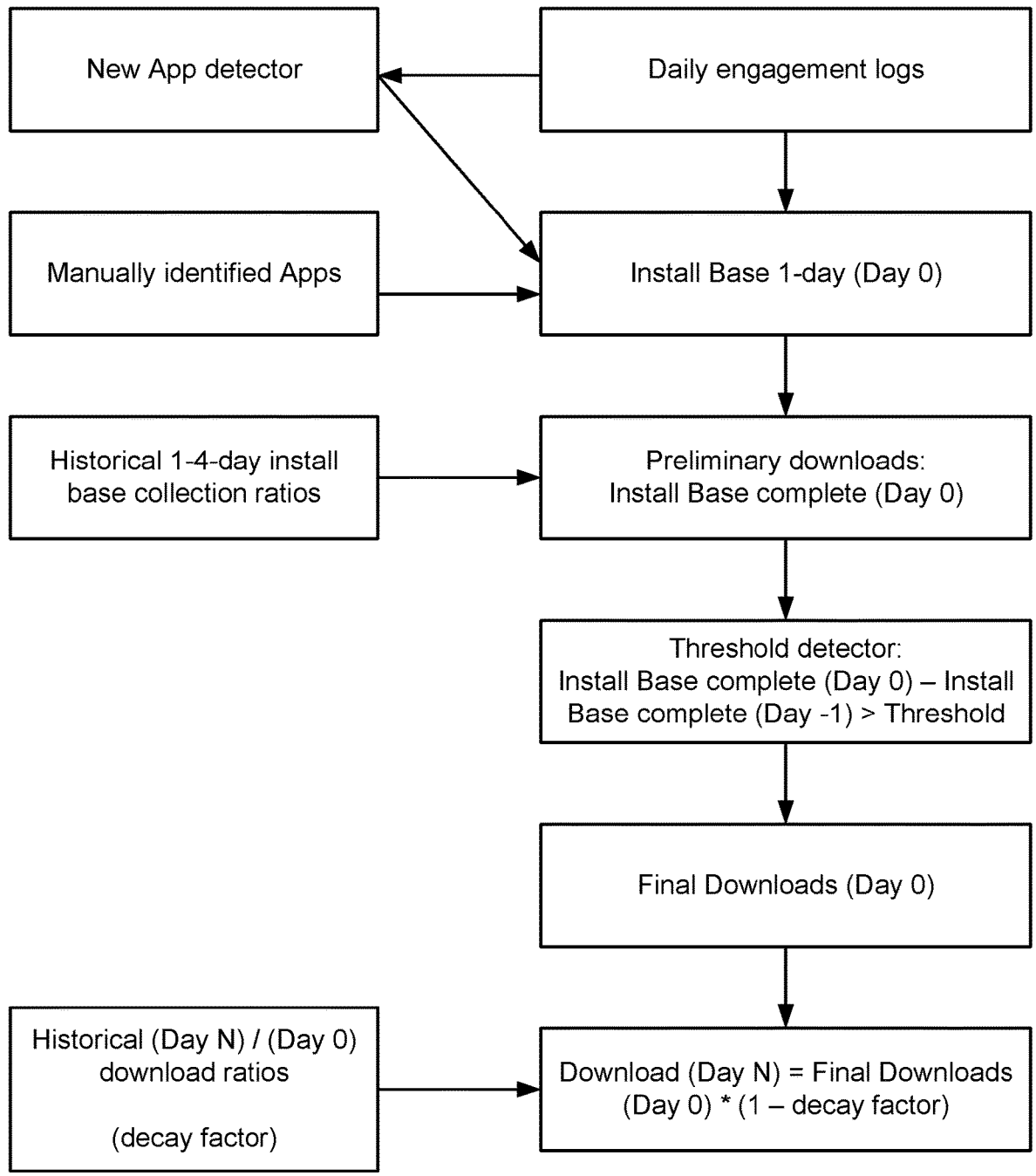
FIG. 2A shows the overall pipeline of the app analytics system, according to one embodiment.
Figure 2B:
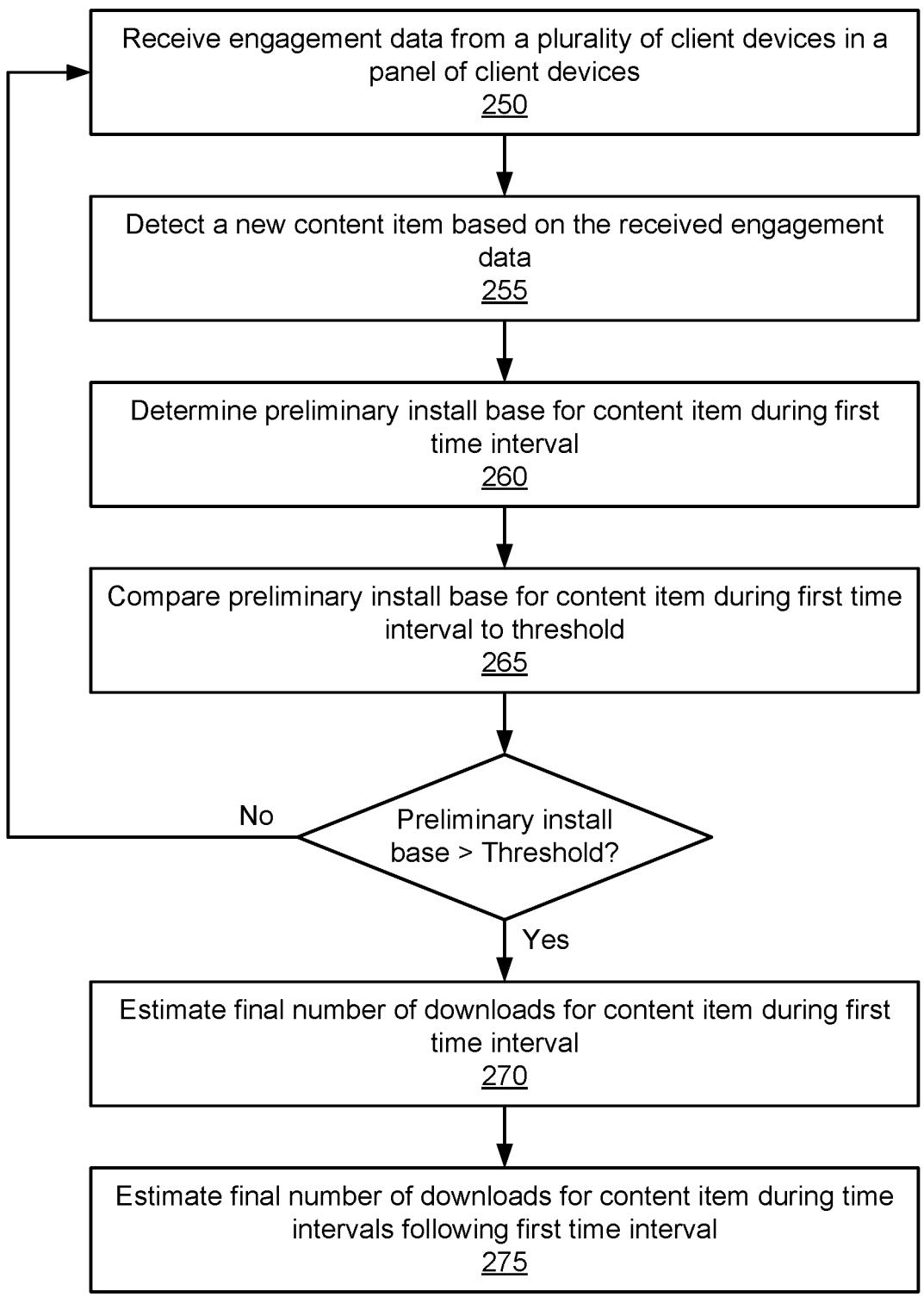
FIG. 2B illustrates a flow diagram of a process for estimating a number of downloads for a content item during one or more time periods, according to one embodiment.

FIG. 2A shows the overall pipeline of the app analytics system 150, according to one embodiment. FIG. 2B illustrates a flow diagram of a process for estimating a number of downloads for a content item during one or more time periods, according to one embodiment.

The app analytics system 150 receives 250 daily engagement data from a set of client devices in a panel of client device. In some embodiments, the app analytics system 150 receives the daily engagement data as one or more daily engagement logs. Based on the daily engagement logs and optionally based on manual input, a new content item (e.g., a new app) is detected 255 and a preliminary install base for the content item during a first time interval is determined 260. In some embodiments, the first time interval is a "Day-0" time interval and the preliminary install based for the content item during the first time interval is a preliminary install base for Day-0. In some embodiments, the preliminary install base for the content item during a first time interval is determined based on the feedback data received for the first time interval from mobile devices 140 that reported back to the app analytics system 150 on the first time interval (i.e., a partial install base for the content item during the first time interval or partial Day-0 install base). Based on the partial install base for the content item during the first time interval, the complete install base for the content item during the first time interval is estimated by extrapolating the partial install base for the content item during the first time interval based on historical data of Day-0 installs reported by mobile devices in the panel for other apps on an initial set of days (e.g., days 1 through 4) of the launch date of the other apps.

The preliminary install based for the content item during the first time interval (i.e., the determined complete install base for the content item during the first time interval) may then be compared 265 to a threshold value. For example, the predictive technology disclosed herein may require at least a threshold number of downloads (e.g., 100,000 downloads) to ensure requisite accuracy of its predictions. In some embodiments, a complete install base for the content item during the time interval preceding the first time interval (i.e., a complete Day −1 install base) is determined and a difference between determined complete install base for the content item during the first time interval (complete Day-0 install base) and the determined complete install base for the content item during the time interval preceding the first time interval (complete Day −1 install base) is compared to the threshold number of download. Responsive to determining that the complete install base for the content item during the first time interval (or the difference between the complete install base for the content item during the first time interval and the complete install base for the content item during the time interval preceding the first time interval) is greater than the threshold, the app analytics system 150 may identify the app as a blockbuster app, and makes an estimation 270 for the final number of downloads for first time interval (final Day-0 downloads). For example, the app analytics system 150 estimates the final number of downloads for first time interval by applying equation (1). In other embodiments, the app analytics system 150 simple assigns the determined preliminary install for the content item for first time interval (i.e., the complete Day-0 install base) as the final number of downloads for the content item for first time interval.

Moreover, the app analytics system 150 estimates 275 the number of downloads for subsequent time intervals by applying an exponential decay determined based on historical data for other apps (e.g., historical data for blockbuster apps).

Android:iOS Download Ratios

The app install flag used above might only be available in specific operating systems. For example, the app install flag might be available on Android devices but not on iOS. In order to support estimates of iOS downloads, Android:iOS ratios are calculated based on the cumulative downloads for apps where we have estimates on both platforms (either Android and iPhone or Android and iPad). For each region, the ratio equals:

$$\frac{\text{Android Downloads}}{\text{iPhone Downloads}} \quad (3)$$

and $$\frac{\text{Android Downloads}}{\text{iPad Downloads}} \quad (4)$$

are determined, respectively. The median ratio across all countries for each device is included as a default iPhone and default iPad ratio. If an estimate is not available for a specific country a default value may be used. In some embodiments, category specific Android:iOS ratios are determined. That is, for each app category of at least a subset of app categories, the ratios shown in equations (3) and (4) are determined. The category specific Android:iOS ratios may then be used support estimates in iOS for apps corresponding to each of the respect app categories.

Computing Machine Architecture

Figure 3:
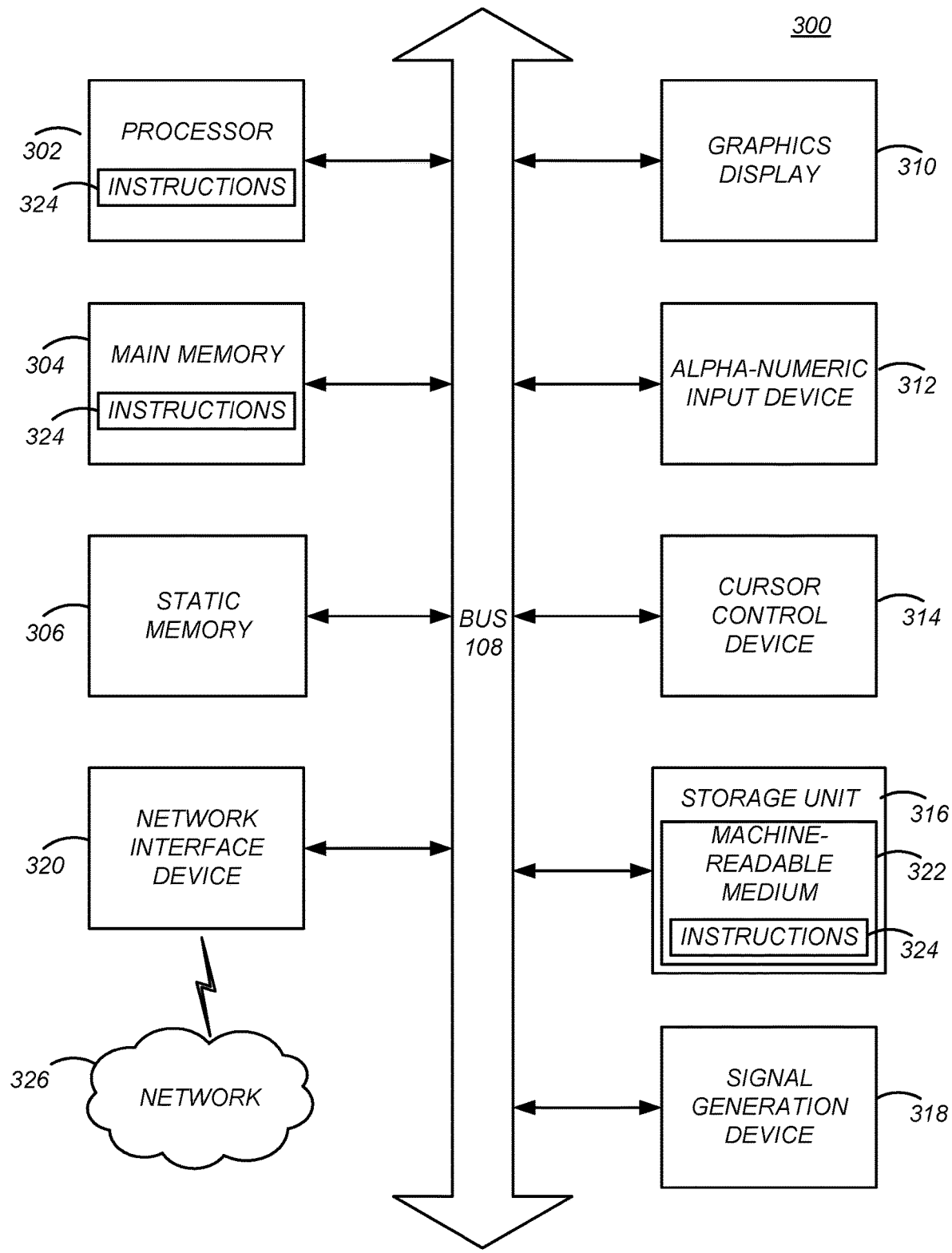
FIG. 3 is a block diagram illustrating components of an example machine able to read instructions from a machine-readable medium and execute them in a processor (or controller).

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which instructions 324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)). The computer system 300 may also include alphanumeric input device 312 (e.g., a keyboard), a cursor control device 314 (e.g., a mouse, a trackball, a joystick, a motion sensor, or other pointing instrument), a storage unit 316, a signal generation device 318 (e.g., a speaker), and a network interface device 820, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should betaken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    installing, by one or more processors, a first instance of a tracking application on a first client device including:
        enabling automated data collection by the first instance of the tracking application from a memory of the first client device, the tracking application generating engagement data based on automatically accessing an application install flag in the memory of the first client device;
    determining, by the one or more processors, a plurality of client devices that have downloaded the tracking application, each instance of the tracking application tracking engagement with one or more software applications based on an application install flag on a corresponding client device, the plurality of client devices including the first client device;
    receiving, by the one or more processors, the engagement data from the tracking application installed on each client device of a set of client devices among the plurality of client devices, the set of client devices being fewer in quantity than the plurality of client devices, the engagement data indicating the engagement with the one or more software applications executed on the set of client devices during a first time interval;
    detecting, by the one or more processors, a software application of the one or more software applications was launched as available for download within the first time interval from a network-based server providing software application publication based on the engagement data;
    based on detecting, from the engagement data, that the software application was launched as available for download, determining, by the one or more processors, a preliminary install base for the software application for the first time interval based on a quantity of installs in the plurality of client devices based on the quantity of the set of client devices reporting the engagement data for the first time interval and a historical rate of client devices reporting engagement data for other software applications;
    determining, by the one or more processors, based on the preliminary install base for the software application for the first time interval, whether an engagement for the software application is greater than a threshold engagement value; and
    responsive to determining that the engagement for the software application is greater than the threshold engagement value, determining, by the one or more processors, based on the preliminary install base for the software application for the first time interval, an estimated number of downloads for the software application during the first time interval.

2. The computer-implemented method of claim 1, wherein the client devices are mobile devices and wherein the software application is a mobile application.

3. The computer-implemented method of claim 1, wherein determining the preliminary install base for the software application for the first time interval comprises extrapolating the preliminary install base for the software application based on historical engagement data for the other software applications.

4. The computer-implemented method of claim 1, further comprising:
    determining an estimated number of downloads for the software application for subsequent days by applying an exponential decay to the estimated number of downloads for the software application during the first time interval.

5. The computer-implemented method of claim 1, wherein determining whether the engagement for the software application is greater than the threshold engagement value comprises:
    determining an install base for the software application based on the preliminary install base;
    determining a difference between the install base for the software application during the first time interval and the install base for the software application during a second time interval preceding the first time interval; and
    comparing the determined difference between the install base for the software application during the first time interval and the install base for the software application during the second time interval to the threshold engagement value.

6. The computer-implemented method of claim 5, further comprising, responsive to determining that the determined difference between the install base for the software application during the first time interval and the install base for the software application during the second time interval is greater than the threshold engagement value, classifying the software application as a blockbuster software application.

7. The computer-implemented method of claim 1, wherein:
    the engagement data is collected by the tracking application on each of the set of client devices and includes a parameter flagged on each mobile device the first time interval, the parameter indicating that the software application is installed on the client device.

8. The computer-implemented method of claim 1, wherein determining the preliminary install base for the software application comprises:
    estimating, by the one or more processors, the quantity of the set of client devices based on the historical rate at which the plurality of client devices reported engagement data in the past, the preliminary install base being inferred from the historical rate.

9. A non-transitory, computer-readable medium comprising one or more instructions that, when executed by one or more processors, cause the one or more processors to perform operations, the one or more instructions comprising instructions to:
install a first instance of a tracking application on a first client device including:
enabling automated data collection by the first instance of the tracking application from a memory of the first client device, the tracking application generating engagement data based on automatically accessing an application install flag in the memory of the first client device;
determine a plurality of client devices that have downloaded the tracking application, each instance of the tracking application tracking engagement with one or more software applications on a corresponding client device, the plurality of client devices including the first client device;
receive the engagement data from the tracking application installed on each client device of a set of client devices among the plurality of client devices, the set of client devices being fewer in quantity than the plurality of client devices, the engagement data indicating the engagement with the one or more software applications executed on the set of client devices during a first time interval;
detect that a software application of the one or more software applications was launched as available for download within the first time interval from a network-based server providing software application publication based on the engagement data;
based on detecting, from the engagement data, that the software application was launched as available for download, determine a preliminary install base for the software application for the first time interval based on a quantity of installs in the plurality of client devices based on the quantity of the set of client devices reporting the engagement data for the first time interval and a historical rate of client devices reporting engagement data for other software applications;
determine, based on the preliminary install base for the software application for the first time interval, whether an engagement for the software application is greater than a threshold engagement value; and
responsive to determining that the engagement for the software application is greater than the threshold engagement value, determine, based on the preliminary install base for the software application for the first time interval, an estimated number of downloads for the software application during the first time interval.

10. The non-transitory, computer-readable medium of claim 9, wherein the client devices are mobile devices and wherein the software application is a mobile application.

11. The non-transitory, computer-readable medium of claim 9, wherein the instructions for determining the preliminary install base for the software application for the first time interval comprise instructions to extrapolate the preliminary install base for the software application based on historical engagement data for the other software applications.

12. The non-transitory, computer-readable medium of claim 9, wherein the instructions further comprise instructions to:
determine an estimated number of downloads for the software application for subsequent days by applying an exponential decay to the estimated number of downloads for the software application during the first time interval.

13. The non-transitory, computer-readable medium of claim 9, wherein the instructions for determining whether the engagement for the software application is greater than the threshold engagement value comprise instructions to:
determine an install base for the software application based on the preliminary install base;
determine a difference between the install base for the software application during the first time interval and the install base for the software application during a second time interval preceding the first time interval; and
compare the determined difference between the install base for the software application during the first time interval and the install base for the software application during the second time interval to the threshold engagement value.

14. The non-transitory, computer-readable medium of claim 13, wherein the instructions further comprise instructions to, responsive to determining that the determined difference between the install base for the software application during the first time interval and the install base for the software application during the second time interval is greater than the threshold engagement value, classify the software application as a blockbuster software application.

15. A system comprising:
one or more processors; and
a non-transitory, computer-readable medium comprising one or more instructions that, when executed by the one or more processors, cause the one or more processors to perform operations, the one or more instructions comprising instructions to:
install a first instance of a tracking application on a first client device including:
enabling automated data collection by the first instance of the tracking application from a memory of the first client device, the tracking application generating engagement data based on automatically accessing an application install flag in the memory of the first client device;
determine a plurality of client devices that have downloaded the tracking application, each instance of the tracking application tracking engagement with one or more software applications on a corresponding client device, the plurality of client devices including the first client device;
receive the engagement data from the tracking application installed on each client device of a set of client devices among the plurality of client devices, the set of client devices being fewer in quantity than the plurality of client devices, the engagement data indicating the engagement with the one or more software applications executed on the set of client devices during a first time interval;
detect that a software application of the one or more software applications was launched as available for download within the first time interval from a network-based server providing software application publication based on the engagement data;
based on detecting, from the engagement data, that the software application was launched as available for download, determine a preliminary install base for the software application for the first time interval based on a quantity of installs in the plurality of client devices based on the quantity of the set of client devices reporting the engagement data for the first time interval and a historical rate of client devices reporting engagement data for other software applications;

determine, based on the preliminary install base for the software application for the first time interval, whether an engagement for the software application is greater than a threshold engagement value; and responsive to determining that the engagement for the software application is greater than the threshold engagement value, determine, based on the preliminary install base for the software application for the first time interval, an estimated number of downloads for the software application during the first time interval.

16. The system of claim 15, wherein the client devices are mobile devices and wherein the software application is a mobile application.

17. The system of claim 15, wherein the instructions for determining the preliminary install base for the software application for the first time interval comprise instructions to extrapolate the preliminary install base for the software application based on historical engagement data for the other software applications.

18. The system of claim 15, wherein the instructions further comprise instructions to:

determine an estimated number of downloads for the software application for subsequent days by applying an exponential decay to the estimated number of downloads for the software application during the first time interval.

19. The system of claim 15, wherein the instructions for determining whether the engagement for the software application is greater than the threshold engagement value comprise instructions to:

determine an install base for the software application based on the preliminary install base;

determine a difference between the install base for the software application during the first time interval and the install base for the software application during a second time interval preceding the first time interval; and compare the determined difference between the install base for the software application during the first time interval and the install base for the software application during the second time interval to the threshold engagement value.

20. The system of claim 19, wherein the instructions further comprise instructions to, responsive to determining that the determined difference between the install base for the software application during the first time interval and the install base for the software application during the second time interval is greater than the threshold engagement value, classify the software application as a blockbuster software application.

* * * * *